March 24, 1925.　　　　　　　　　　　　　　　1,530,681
J. A. LONG
INSECT DESTROYER
Filed Jan. 20, 1923　　2 Sheets-Sheet 1
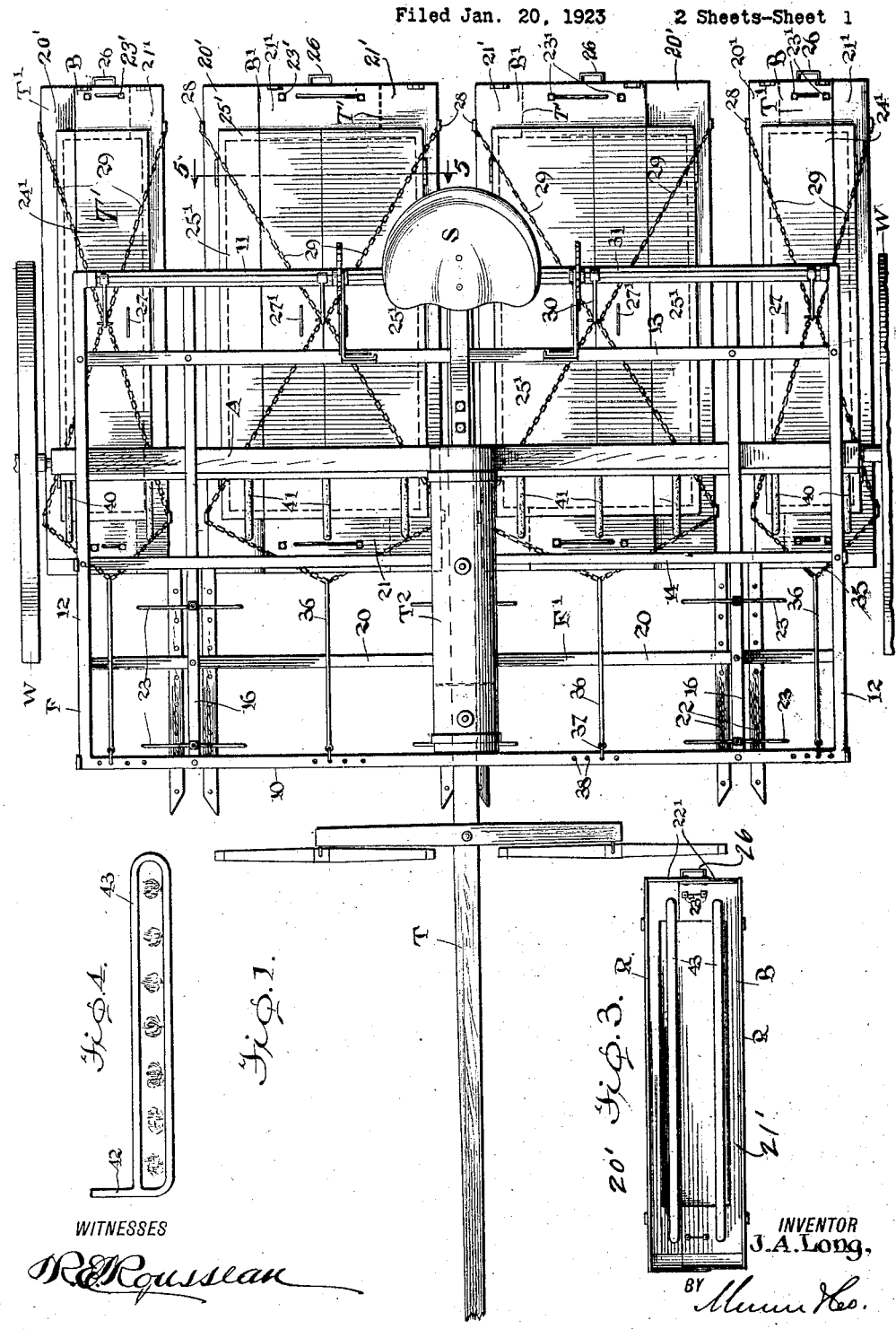

March 24, 1925. 1,530,681
J. A. LONG
INSECT DESTROYER
Filed Jan. 20, 1923 2 Sheets-Sheet 2
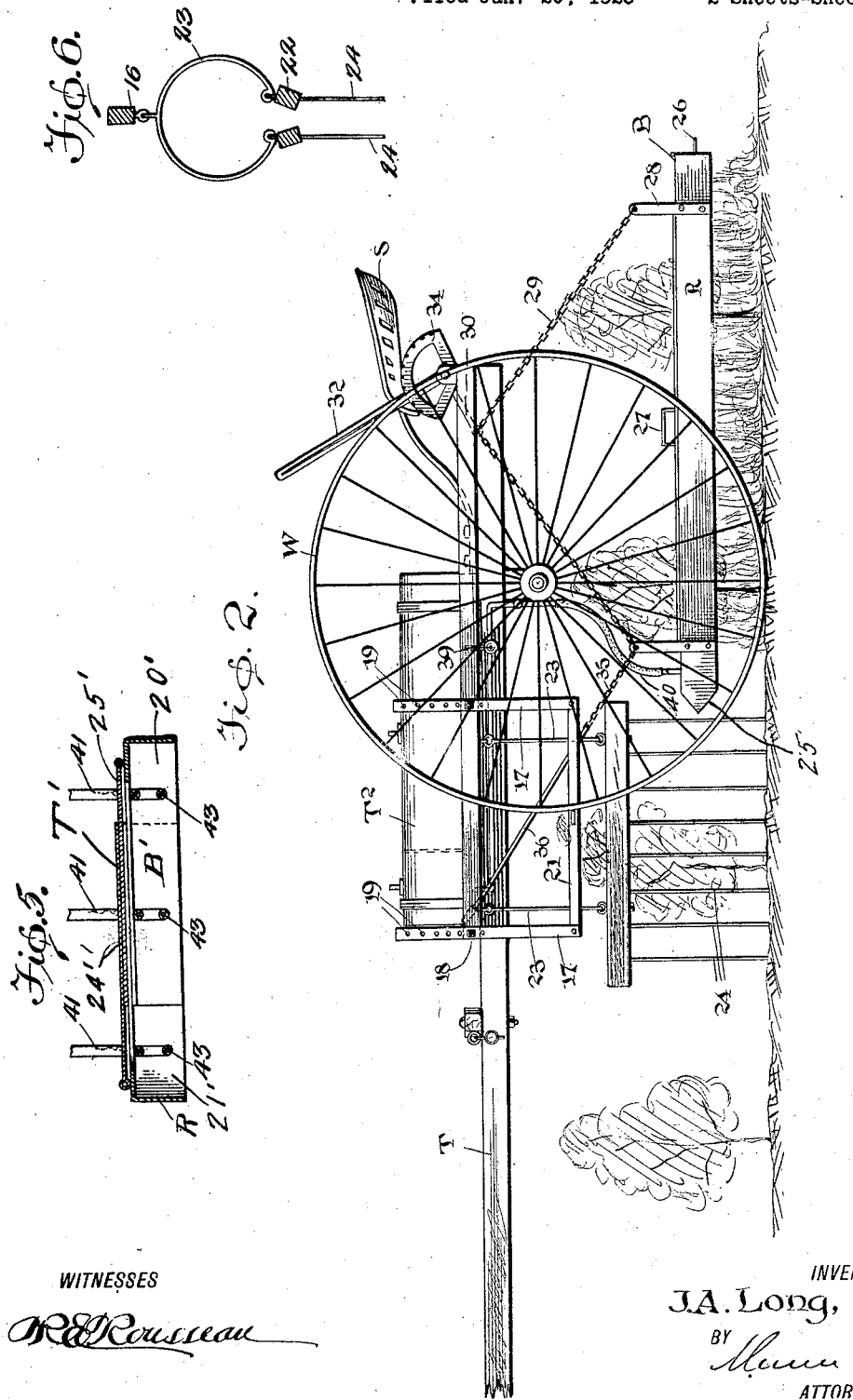
WITNESSES
INVENTOR
J. A. Long,
BY
ATTORNEYS Patented Mar. 24, 1925.

1,530,681

UNITED STATES PATENT OFFICE.

JOHN A. LONG, OF FORT STOCKTON, TEXAS.

INSECT DESTROYER.

Application filed January 20, 1923. Serial No. 614,011.

*To all whom it may concern:*

Be it known that I, JOHN A. LONG, a citizen of the United States, and a resident of Fort Stockton, in the county of Pecos and State of Texas, have invented certain new and useful Improvements in Insect Destroyers, of which the following is a specification.

This invention relates to an insect destroyer. The invention more particularly relates to a device for destroying insects injurious to plant life, such as boll weevil, worms or the like.

The object of the invention is to provide means whereby boll weevil or like insects may be dislodged from plants and then subjected to a flame, poisonous vapor or the like whereby to destroy the same.

It is also an object of the invention that the device be adapted to operate on one or more rows of plants.

A further object of the invention is that the device will not injure the plants being operated upon.

It is also within the scope of the objects of the invention that the device be easy to manipulate and durable.

Other objects and advantages relating to details of construction, combination and arrangement of parts will hereinafter appear in the detailed description to follow.

The invention is illustrated by way of example in the accompanying drawings, in which:

Figure 1 is a top plan view of an insect destroying machine or device constructed in accordance with the present invention, Figure 2 is a view in side elevation of the same, and Figure 3 is a bottom plan view of one of the vapor or fire boxes employed in connection with the device, Figure 4 is a detail view in side elevation of a form of burner which may be employed.

Figure 5 is a transverse sectional view through one of the burner boxes.

Figure 6 is a transverse sectional view of the baffle plate members.

Referring to the drawings more particularly, the apparatus may be carried by running gear and said running gear may comprise a pair of wheels W, an axle A, a frame F, and tongue T, and the usual driver's seat S.

The parts heretofore referred to, of the device may be of any desired construction, and made of any suitable material. The frame F preferably consists in the forward and rear members 10 and 11 respectively and the two side members 12. These members may be made of angle iron or the like. Also there may be extended between the end members a pair of frame members 13 and 14 and between the members 10 and 11 there may be extended a pair of members 16, one adjacent each side member 12 as shown to advantage in Figure 1 of the drawings. The tongue T may be secured to the axle A in any preferable manner, and likewise the tongue T may be secured to the frame F.

To each side member 12 there is secured a pair of supporting arms or members 17. Each member 17 is secured to its associated frame member 12 by a bolt 18 and also each member 17 is provided with a plurality of openings 19 arranged in superposed spaced relation adjacent the upper end thereof whereby the same may be adjustably raised and lowered. The members 17 support a frame generally indicated by the reference character F', said frame comprising a plurality of slats 20 which are secured together by similar members 21.

The present device is designed and constructed to operate upon three different rows of plants at one time. The frame F' is adapted to engage the tops of the plants and vibrate or shake the same. Also for each row of plants operated upon there is provided a pair of insect deflector members 22, each member 22 being supported by a pair of rods 23. The rods 23 are resilient and curved as shown. Each member 22 has depending therefrom a plurality of wires 24, said wires being extremely flexible and resilient. With the forward movement of the machine a member 22 of each pair is adapted to move upon one side of a row of plants and the wires 24 are adapted to sweep the earth beneath the plants and tend to move insects toward the area covered by the boxes B and B'. Also it will be noted that the members 22 are tilted in order to present an upper inclined surface. With this arrangement the insects falling upon the members 22 will be deflected toward the space between adjacent rows of plants being operated upon.

As shown in Figure 1, the present machine or device carries four fire or vapor boxes, the outside boxes B being of less width than the two inner boxes B'. The boxes are similar in construction. Each box comprises a pair of sections 20', and 21', respectively, and each section comprises a runner R and a top section T'. The forward end of each runner R is beveled as shown at 25, Figure 2, and the rear end of each box structure is closed by a pair of hinged doors 22', Figure 3. The doors overlap and are adjustably secured to each other, as best shown in Figure 3 of the drawings. One of these doors may be provided with a handle 26, if desired. The section 21' in each instance overlaps section 20'. The sections 21' and 20' of each box are adjustably secured together by a pair of bolts 23', said bolts being disposed in transverse slots formed in the section tops T', as shown. As is obvious, the width of boxes B and B' may be adjusted by manipulating the bolts 23. The section 21' of each box B has its top provided with a hinged door 24' and each section 20' is provided with a hinged door 25'. By the provision of these different doors access may be easily had to the interior of boxes B and B'. The door 24' of each box B may be provided with a handle 27.

Each of the boxes B and B' is provided with four upstanding members 28, said members being preferably arranged as shown and connected by diagonally disposed chains 29. At the point where the chains 29 cross the same are connected to an arm 30 which is rigidly connected with a shaft 31, the shaft 31 being mounted upon the rear frame member 11. A hand lever 32 is rigidly secured to the shaft and a ratchet sector 34 is provided and secured to the rear frame member 11 and adapted to cooperate with a spring pressed pawl carried upon the lever 32 whereby to adjustably hold the shaft 31 against rotation. By this particular arrangement, it is obvious the boxes B and B' may be lifted and maintained at any height with respect to the soil being passed over. The boxes B and B' may also be permitted to drag upon the soil if so desired.

To each of the boxes B and B' there is connected the ends of a chain 35, and said chain in each instance being in turn connected at a point intermediate its ends with a rod or link 36. Each link 36 is connected to the forward frame member 10 by the means of a clevis or link 37. The frame member 10 at point of connection of each of the rods 36 is provided with a plurality of openings 38, whereby the rods may be moved with respect to each other and thereby to adjust the distance between the different boxes B and B'.

Upon the running gear there is mounted a tank T² which may be of any desired construction and which may be secured to the frame F in any desirable manner. The tank T² should be adapted to hold a liquid fuel or poisonous vapor gas, and suitable means should be provided whereby the tank can be filled with liquid fuel, poisonous vapor or gas.

A pipe 39 may be extended parallel with the axle A and supported in any desirable manner and preferably from this pipe there extends a pair of flexible tubes 40 for each of the boxes B and three of the same kind of tubes as at 41 for each of the boxes B'. The top of each box B supports a pair of burners while the top of the boxes B' should support three burners. The burners are of similar construction, each comprising a pipe 42, terminating in a tubular loop 43 as shown in Figure 4. These burners are mounted within the boxes B or B' in any desirable manner, and the lowermost portion of the loop 43 in each instance is provided with a plurality of ejection orifices or nozzles. The pipe 42 of the burners carried by box B is connected to its respective tube 40, while the same pipe or burner in boxes B' are connected to the tube 41. Also suitable means may be provided whereby air pressure may be employed if so desired to forcibly eject gaseous fuel from the burners or eject vapor gas or the like.

In the use of the present device, the same is drawn over the field in which the plants to be operated upon are arranged in rows as is customary. The device, as has been stated, is designed and constructed to operate upon three rows and the frame F' should be so adjusted that it will encounter the tops of the plants and shake the same. The wires extending downwardly from each of the pair of guide members 22 will engage the branches and leaves upon each side of the rows of plants and further shake or vibrate the plants to dislodge insects thereon. Assuming that the device is operating upon rows of cotton and also assuming that a flame is being employed to kill the boll weevil which may be dislodged from the cotton plants, the boxes B and B' are preferably lowered so that they rest upon the soil and with the movement of the device, these boxes will pass over any boll weevil which have been shaken from the plants.

It should also be noted that the member 22 tends to direct the insects away from the cotton plants and thus insure that all insects dislodged from the cotton plants will pass beneath the boxes B and B'. The flow of gaseous fuel from the tank 2 into the burners B² should be adjusted so that a flame will proceed from each of the nozzles of the different burners and thus as the insects pass beneath the boxes B and B' the same will be subjected to this flame and destroyed. Also, as heretofore described, a poisonous vapor gas may be employed with substantially the same efficiency for destroying the boll weevil or a similar insect.

While I have shown and described the preferred form of my invention, I wish it to be understood that I am aware of the fact that the construction, combination and arrangement of parts may be changed by those skilled in the art without departing from the spirit of the invention, as indicated by the appended claims.

I claim:—

1. A device of the character described, comprising a running gear adapted to move over a plurality of rows of plants, a vertically adjustable frame carried by said running gear and adapted to be brought to engage said plants whereby to vibrate the same for dislodging insects therefrom, means carried by the running gear adapted to cause the insects dislodged from said plants to be thrown away from the rows of plants comprising a series of rods extending downwardly from the running gear, said rods being arranged so that a series will be disposed upon each side of a row of plants being operated upon and adapted to engage the plants and cause insects to be dislodged therefrom to be thrown away from said plants, and means carried by the running gear adapted to operate between adjacent rows and destroy the insects dislodged from the plants.

2. In an apparatus of the character described, a running gear and a pair of resiliently supported and oppositely inclined baffle members adapted to straddle a row of plants carried by the running gear.

3. In an apparatus of the character described, a running gear, a pair of oppositely inclined and elongated baffle plate members carried by the running gear, and resilient curved rods for depending said baffle plates from the running gear.

4. In an apparatus of the character described, a running gear, a pair of oppositely inclined and elongated baffle plate members supported by the running gear adapted to straddle a row of plants, and a plurality of highly flexible rods extending downwardly from each baffle plate.

5. In an apparatus of the character described, a running gear, a pair of oppositely inclined and elongated baffle plates, a plurality of bow shaped rods supporting said baffle plates beneath the running gear, said plates being spaced to straddle a row of plants, and a plurality of highly flexible rods extending downwardly from each baffle plate.

JOHN A. LONG.